(12) United States Patent
Lee et al.

(10) Patent No.: US 12,132,560 B2
(45) Date of Patent: Oct. 29, 2024

(54) DATA TRANSMISSION METHOD, DATA TRANSMISSION APPARATUS, AND COMPUTER-READABLE RECORDING MEDIUM STORING INSTRUCTIONS TO PERFORM DATA TRANSMISSION METHOD

(71) Applicant: Research & Business Foundation SUNGKYUNKWAN UNIVERSITY, Suwon-si (KR)

(72) Inventors: Tae-Jin Lee, Suwon-si (KR); Ji-Ho Park, Suwon-si (KR); Yijun Piao, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/987,214

(22) Filed: Nov. 15, 2022

(65) Prior Publication Data

US 2023/0208503 A1 Jun. 29, 2023

(30) Foreign Application Priority Data

Nov. 16, 2021 (KR) .......................... 10-2021-0157640

(51) Int. Cl.
*H04B 7/15* (2006.01)
*H04B 7/0452* (2017.01)

(52) U.S. Cl.
CPC ............. *H04B 7/15* (2013.01); *H04B 7/0452* (2013.01)

(58) Field of Classification Search
CPC ..... H04W 24/08; H04W 16/28; H04W 24/02; H04W 48/16; H04W 72/0446; H04W 64/00; H04W 72/23; H04W 72/542; H04W 48/00; H04L 5/0048; H04L 5/14; H04L 5/0023; H04L 5/0035; H04L 5/0053; H04L 5/0051; H04L 25/0232; H04L 5/0073; H04L 27/2602; H04B 7/024; H04B 7/0452; H04B 7/0617; H04B 7/0626;
(Continued)

(56) References Cited

U.S. PATENT DOCUMENTS 11,429,105 B2 * 8/2022 Sorin .................... G05D 1/0274
11,888,505 B2 * 1/2024 Dutta .................... H04W 24/08
(Continued)

FOREIGN PATENT DOCUMENTS

WO WO 2021/207748 A2 10/2021

OTHER PUBLICATIONS

Liu, Yuanwei, et al. "Reconfigurable Intelligent Surfaces: Principles and Opportunities." IEEE communications surveys & tutorials 23.3, arXiv:2007.03435v3 [eess.SP] May 4, 2021, (73 pages).
(Continued)

*Primary Examiner* — Eva Y Puente
(74) *Attorney, Agent, or Firm* — NSIP Law (57) ABSTRACT

There is provided a method for transmitting data. The method for transmitting data comprises arranging a plurality of RIS based on INFO message of an AP; grouping a plurality of terminals disposed within a predetermined distance from the RIS for each RIS based on distance information from the RIS; and when data is received in the RIS from at least one or more of the grouped terminals, transmitting the received data to the AP.

20 Claims, 8 Drawing Sheets

(58) Field of Classification Search
CPC .... H04B 7/0456; H04B 7/0695; H04B 7/022; H04B 7/04013
USPC ........................................................ 375/262
See application file for complete search history.

(56) References Cited

U.S. PATENT DOCUMENTS

| | | | |
|---|---|---|---|
| 2021/0013619 A1 | 1/2021 | Alkhateeb et al. | |
| 2022/0232422 A1* | 7/2022 | Dai | H04W 72/21 |
| 2023/0086052 A1* | 3/2023 | Nam | H04B 7/155 |
| | | | 370/315 |
| 2023/0087862 A1* | 3/2023 | Dai | H04B 7/0617 |
| | | | 370/315 |
| 2023/0371123 A1* | 11/2023 | Lee | H04L 1/1854 |
| 2024/0031823 A1* | 1/2024 | Duan | H04B 7/088 |

OTHER PUBLICATIONS

Xu, Xiaoxia, et al. "Graph-Embedded Multi-Agent Learning for Smart Reconfigurable THz MIMO-NOMA Networks." IEEE Journal on Selected Areas in Communications 40.1, arXiv:2107.07198v3 [eess.SP] Oct. 25, 2021, (16 pages).

Korean Office Action issued on Feb. 23, 2024, in counterpart Korean Patent Application No. 10-2021-0157640 (5 pages in English, 5 pages in Korean).

Korean Office Action issued on Aug. 22, 2024, in counterpart Korean Patent Application No. 10-2021-0157640 (3 pages in English, 7 pages in Korean).

\* cited by examiner

| Parameter | Value |
|---|---|
| SIZE OF FRAME | 100 |
| NUMBER OF IOT TERMINAL GROUPS | 2, 3, 4 |
| NUMBER OF IOT TERMINALS | 100 ~ 1000 |
| RIS COVERAGE FOR GROUPING(m) | 20 |

FIG.8

DATA TRANSMISSION METHOD, DATA TRANSMISSION APPARATUS, AND COMPUTER-READABLE RECORDING MEDIUM STORING INSTRUCTIONS TO PERFORM DATA TRANSMISSION METHOD

CROSS-REFERENCE TO RELATED APPLICATION

This application claims priority to Korean Patent Application No. 10-2021-0157640, filed on Nov. 16, 2021. The entire contents of the application on which the priority is based are incorporated herein by reference.

TECHNICAL FIELD

Embodiments relate to a data transmission method and apparatus capable of improving a collision problem between terminals by utilizing a reconfigurable intelligent surface (RIS) when terminals perform communication in an Internet of Things (IoT) network environment.

This work was supported by National Research Foundation of Korea (NRF) grant funded by Korea government (MSIT) (No. 2021R1A2B5B01002661, Integrated Networks for High-Scalability Beamforming-Backscatter Communications with Multi-Reconfigurable Intelligent Surface (RIS)).

BACKGROUND

In general, in an access process of an IoT network, a collision avoidance process is performed using a Frame Slotted ALOHA (FSA) protocol based on Slotted ALOHA. In the FSA protocol, the number of time slots in a frame used for communication between an access point (AP) and a terminal is fixed. When the AP broadcasts a query message containing information on the frame size and slot size to terminals, the terminals select a time slot to transmit within the frame using the information included in the request message, and then, data transmission is attempted in the selected time slot.

However, since the size of the frame is fixed in the FSA protocol, if the number of terminals is greater than the number of time slots in the frame, the probability of collision increases and performance deteriorates. In addition, when the number of terminals is less than the number of slots in a frame, the number of empty slots increases and time slots are wasted, resulting in reduced efficiency.

SUMMARY

In order to solve the above problems, an object of the embodiment is to provide a data transmission method and apparatus for avoiding data collision when a terminal performs communication.

In accordance with an aspect of the present disclosure, there is provided a method for transmitting data, the method may comprise: arranging a plurality of RIS based on INFO message of an AP; grouping a plurality of terminals disposed within a predetermined distance from the RIS for each RIS based on distance information from the RIS; and when data is received in the RIS from at least one or more of the grouped terminals, transmitting the received data to the AP.

In the transmitting of the received data to the AP, the terminal may receive a query message from the AP, select a time slot within a frame included in the query message, and transmit data to the RIS within the selected time slot.

The query message of the AP may include information on a size and a time slot of a frame used for communication between the AP and the terminal.

The transmitting of the received data to the AP may comprise calculating a random number within the size of the frame, selecting the time slot, and providing the calculated random number to the AP.

The transmitting of the received data to the AP may comprise transmitting the data to the RIS within a time slot corresponding to the random number upon receiving an ACK message including the random number from the AP.

The transmitting of the received data to the AP may comprise transmitting the data received by the RIS to the AP by beamforming.

The INFO message may include the reflection angle of the RIS.

In accordance with another aspect of the present disclosure, there is provided an apparatus for transmitting data, the apparatus may comprise: a memory in which a data transmission control program is stored; and a processor executing the data transmission control program, wherein the processor arranges a plurality of RIS based on an INFO message of an AP, groups a plurality of terminals disposed within a certain distance from the RIS based on distance information from the RIS for each RIS, and when data is received in the RIS from at least one of the grouped terminals, transmits the received data to the AP.

The processor may transmit the data received by the RIS to the AP by beamforming.

The INFO message may include the reflection angle of the RIS.

The processor may check a query message received from the AP, select a time slot within a frame included in the query message, and transmit data to the RIS within the selected time slot.

The query message may include information on a size and a time slot of a frame used for communication between the AP and the terminal.

The processor may calculate a random number within the size of the frame, select the time slot, and provide the calculated random number to the AP.

The processor may transmit the data to the RIS within a time slot corresponding to the random number upon receiving an ACK message including the random number from the AP.

In accordance with another aspect of the present disclosure, there is provided a non-transitory computer-readable storage medium including computer executable instructions, wherein the instructions, when executed by a processor, cause the processor to perform a data transfer method, the method may comprise: arranging a plurality of RIS based on INFO message of an AP; grouping a plurality of terminals disposed within a predetermined distance from the RIS for each RIS based on distance information from the RIS; and when data is received in the RIS from at least one or more of the grouped terminals, transmitting the received data to the AP.

The embodiment mitigates collisions occurring in the access process in which a terminal selects a time slot in a frame for data transmission in an IoT network environment by transmitting data using RIS, thereby improving data throughput performance compared to the existing FSA protocol method.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Hereinafter, embodiments will be described in detail with reference to the drawings.

Figure 1:
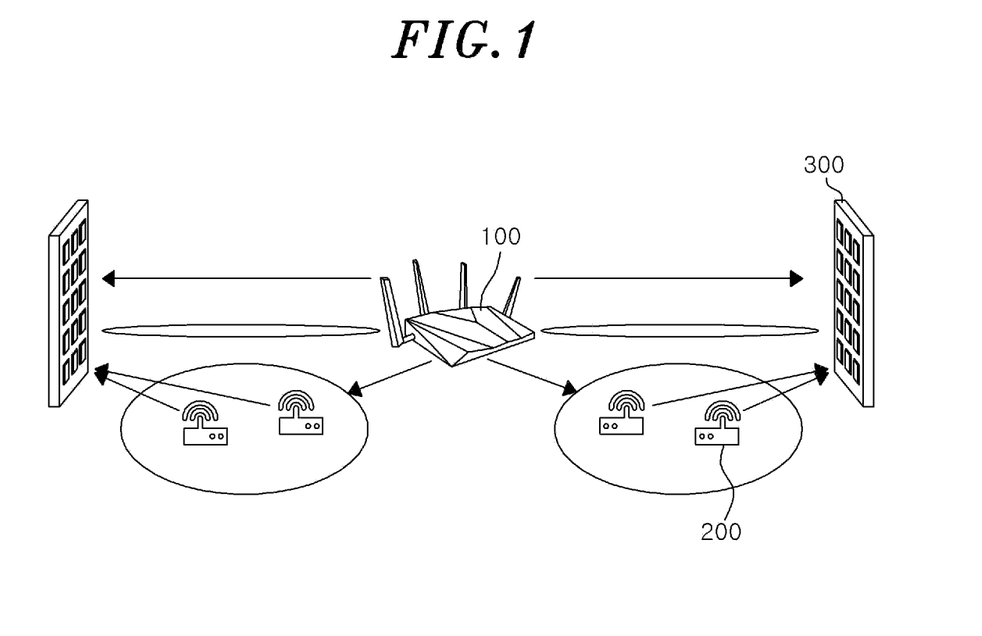
FIG. 1 is a block diagram showing a data transmission system according to an embodiment.
Figure 2:
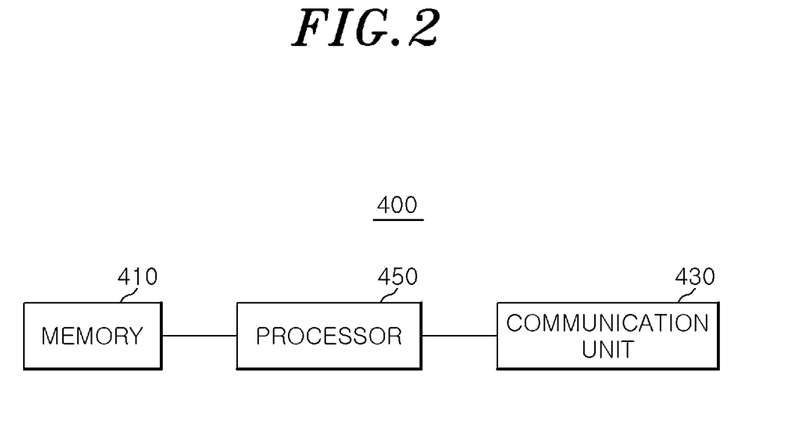
FIG. 2 is a block diagram illustrating a data transmission apparatus for controlling the data transmission system according to the embodiment.

FIG. 1 is a block diagram showing a data transmission system according to an embodiment, and FIG. 2 is a block diagram showing a data transmission apparatus controlling the data transmission system according to the embodiment.

Referring to FIG. 1, the data transmission system 1000 according to the embodiment may include an access point (AP) 100, a plurality of terminals 200, and a reconfigurable intelligent surface (RIS) 300.

The AP 100 may be a device that transmits data frames in a wireless LAN environment. The AP 100 may transmit data frames to a plurality of terminals 200. The AP 100 may receive data from the plurality of terminals 200.

When the plurality of terminals 200 transmit data to the AP 100 at the same time, data collision may occur, so in the embodiment, the RIS 300 may be provided. The terminal 200 may transmit data to the RIS 300 without directly transmitting data to the AP 100, and the RIS 300 may reflect data received from the terminal 200 and transmit the data to the AP 100. Here, the RIS may transmit data received from the terminal to the AP in a beamforming manner. Therefore, even if the plurality of terminals 200 simultaneously transmit data, data collision may not occur by transmitting data to the AP 100 through different RIS 300.

A plurality of RIS 300 may be provided, and the plurality of RIS 300 may be disposed toward the AP 100 by the INFO message of the AP 100. The INFO message may include reflection angle information.

The RIS 300 can change scattering, absorption, reflection and diffraction characteristics over time and can be controlled by software. If these characteristics are utilized, communication performance can be improved in an environment where communication is difficult or limited.

A plurality of reflecting elements are attached to the RIS 300, and the reflecting elements can be adjusted in detail by changing an internal PIN diode or varactor diode. That is, a phase shift difference may be generated due to load generation according to the on/off state of the PIN diode.

Accordingly, the RIS 300 may reflect data received from the terminal 200 in a specific direction by beamforming.

A plurality of terminals 200 may be grouped in the RIS 300. Accordingly, the terminals 200 can transmit data to the AP 100 through different RIS 300, thereby preventing data collision.

The operation of the data transmission system 1000 according to the embodiment may be controlled by the data transmission apparatus 400.

As shown in FIG. 2, the data transmission apparatus 400 may include a memory 410, a communication unit 430, and a processor 450.

The memory 410 may store various data for overall operation of the data transmission apparatus 400, such as a control program for processing by the processor 450 or data transmission. Specifically, the memory 410 may store a plurality of application programs run by the data transmission apparatus 400, a plurality of application programs run by the data transmission apparatus 400, and data and commands for operation of the data transmission apparatus 400.

The memory 410 may include magnetic storage media or flash storage media, but is not limited thereto.

The communication unit 430 is connected to the data transmission system 1000 and may provide a communication interface capable of communicating with the data transmission system 1000 using a plurality of communication methods.

The communication unit 430 may be a device including hardware and software necessary for transmitting/receiving a signal such as a control signal or a data signal through a wired/wireless connection with another network device.

The communication unit 430 may perform communication using a Low Power Wireless Network (LPWN) and a Low Power Wide Area Network (LPWAN) such as NB-IoT, LoRa, SigFox, and LTE-CAT1, as well as 3G, LTE, and 5G.

The communication unit 430 may perform communication using a communication method using a wired local area network (LAN) as well as a wireless LAN such as WiFi 80211*a/b/g/n*. In addition to this, the communication unit 230 may perform communication with the system 1000 using a communication method such as NFC or Bluetooth.

The processor 450 may control the data transmission device 400 as a kind of central processing unit.

The processor 450 may include any type of device capable of processing data. Here, a 'processor' may refer to a data processing device embedded in hardware having, for example, a physically structured circuit to perform functions expressed by codes or instructions included in a program. As an example of such a data processing device built into hardware, a processing device such as a microprocessor, a central processing unit (CPU), a processor core, a multiprocessor, an application-specific integrated circuit (ASIC), and a field programmable gate array (FPGA) may be covered, but it is not limited thereto.

Hereinafter, a data transmission control method performed by the processor 450 of the data transmission device 400 will be described.

Figure 3:
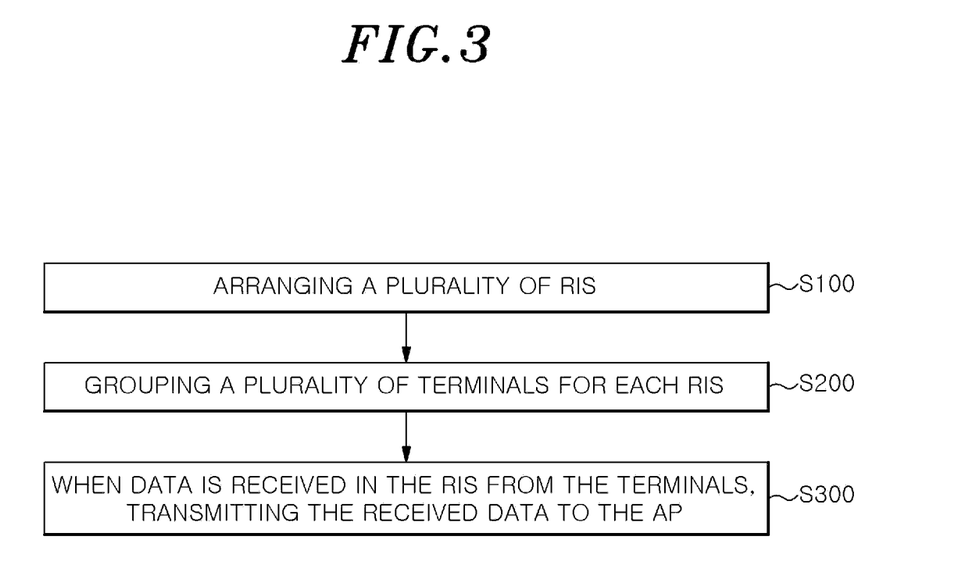
FIG. 3 is a flowchart illustrating the data transmission method according to the embodiment.
Figure 4:
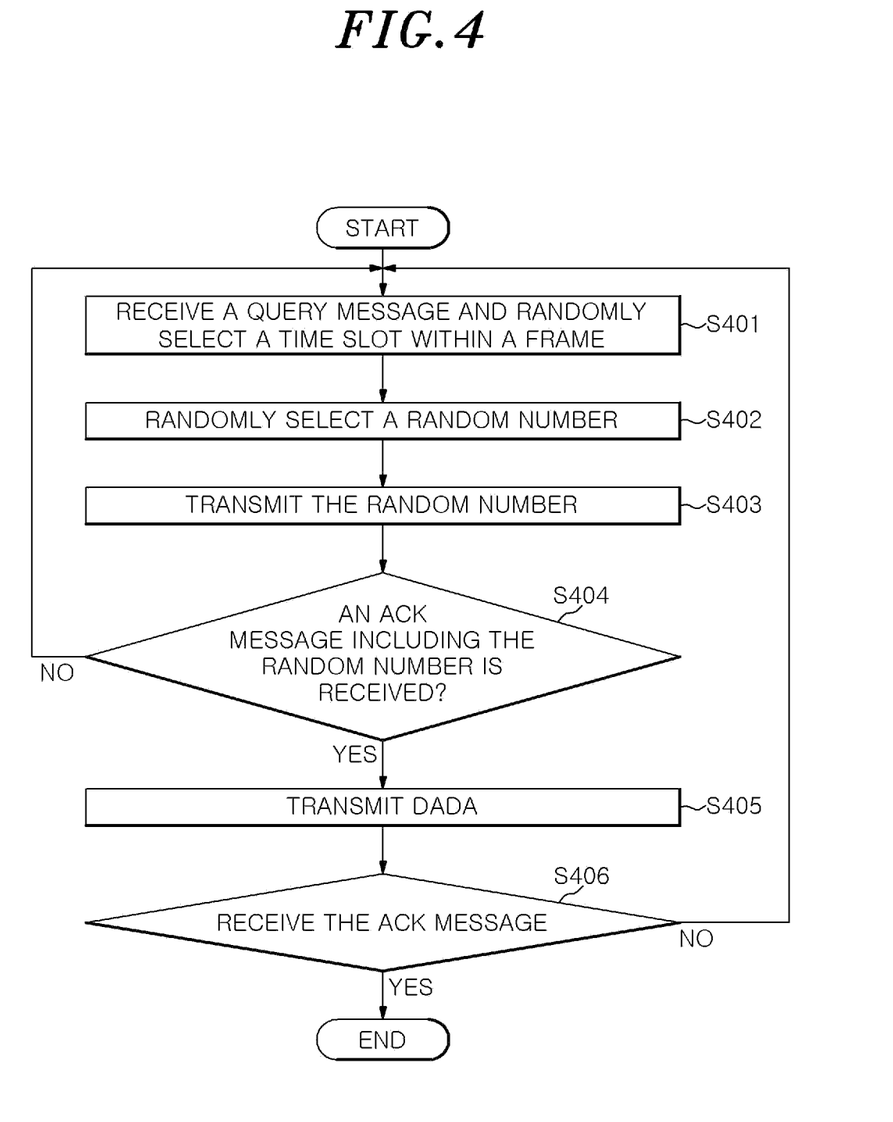
FIG. 4 is a diagram illustrating the operation of the data transmission system according to the embodiment.

FIG. 3 is a flowchart illustrating a data transmission method according to the embodiment, and FIG. 4 is a diagram illustrating an operation of the data transmission system according to the embodiment.

Referring to FIG. 3, the processor 450 may control to place a plurality of RIS based on an AP (S100). The processor 450 may control the AP to transmit an INFO message to the RIS. Processor 450 may place the RIS based on the INFO message. Since the INFO message includes the reflection angle, the RIS can be placed towards the AP.

The processor 450 may group a plurality of terminals (S200). The processor 450 may group a plurality of terminals disposed within a predetermined distance from the RIS for each RIS based on the location of the RIS. For example, terminal 1 and terminal 2 may be grouped in RIS A, and terminal 3 and terminal 4 may be grouped in RIS B.

When data is received from the terminal in the RIS, the processor 450 may control the transmission of the received data to the AP (S300). The processor 450 may reflect data received by the RIS toward the AP through beamforming.

Referring to FIG. 4, the data transmission system 1000 may consist of a sequential slot selection step and a transmission step.

The AP 100 may transmit a query message including a frame size to the terminals 200 to receive data. Thereafter, RIS Info is transmitted to RIS A 310 and RIS B 320 to align RIS according to positions of terminals 200 belonging to the corresponding group.

The terminals 200 randomly select a slot within the received frame size and transmit a random number to the AP. The random number is arbitrary 16-bit information owned by the terminal 200 and temporarily serves as a unique ID.

In the first frame, terminal 1 210 and terminal 2 220 transmit random numbers in the same slot, and a collision occurs. In addition, terminal 3 230 and terminal 4 240 also select the same slot and a collision occurs. As collisions occur during the random number transmission process, terminals cannot perform data transmission.

In the second frame, device 2 220 and device 3 230 transmit random numbers in the same slot, but device 2 220 belongs to group A and device 3 230 belongs to group B, so no collision occurs. This is because the RIS A 310 reflects the data of terminal 2 220 and transmits it to the AP 100, and the RIS B 320 reflects the data of terminal 3 230 and transmits the data to the AP 100. Since the reflection beams of the RIS A 310 and the RIS B 320 are set differently, the AP 100 can receive the beams without collision.

Terminal 1 210 and terminal 4 240 transmit random numbers in different slots, so a collision does not occur. The random numbers transmitted by terminal 1 210 and terminal 4 240 are reflected through the RIS 310, 320 of each group and transmitted to the AP 100. Upon receiving the random number without collision, the AP 100 transmits an ACK message to the terminals 200, the terminal 200 transmits data to the AP, and the AP 100 that received the data transmits an ACK message to the terminals 200, thereby completing the data collection process.

Although the data transmission device controls the entire system in the above, it may be controlled for each component of the system. Hereinafter, referring to FIGS. 5 and 6, an operation of controlling the terminal or the AP will be described.

Figure 5:
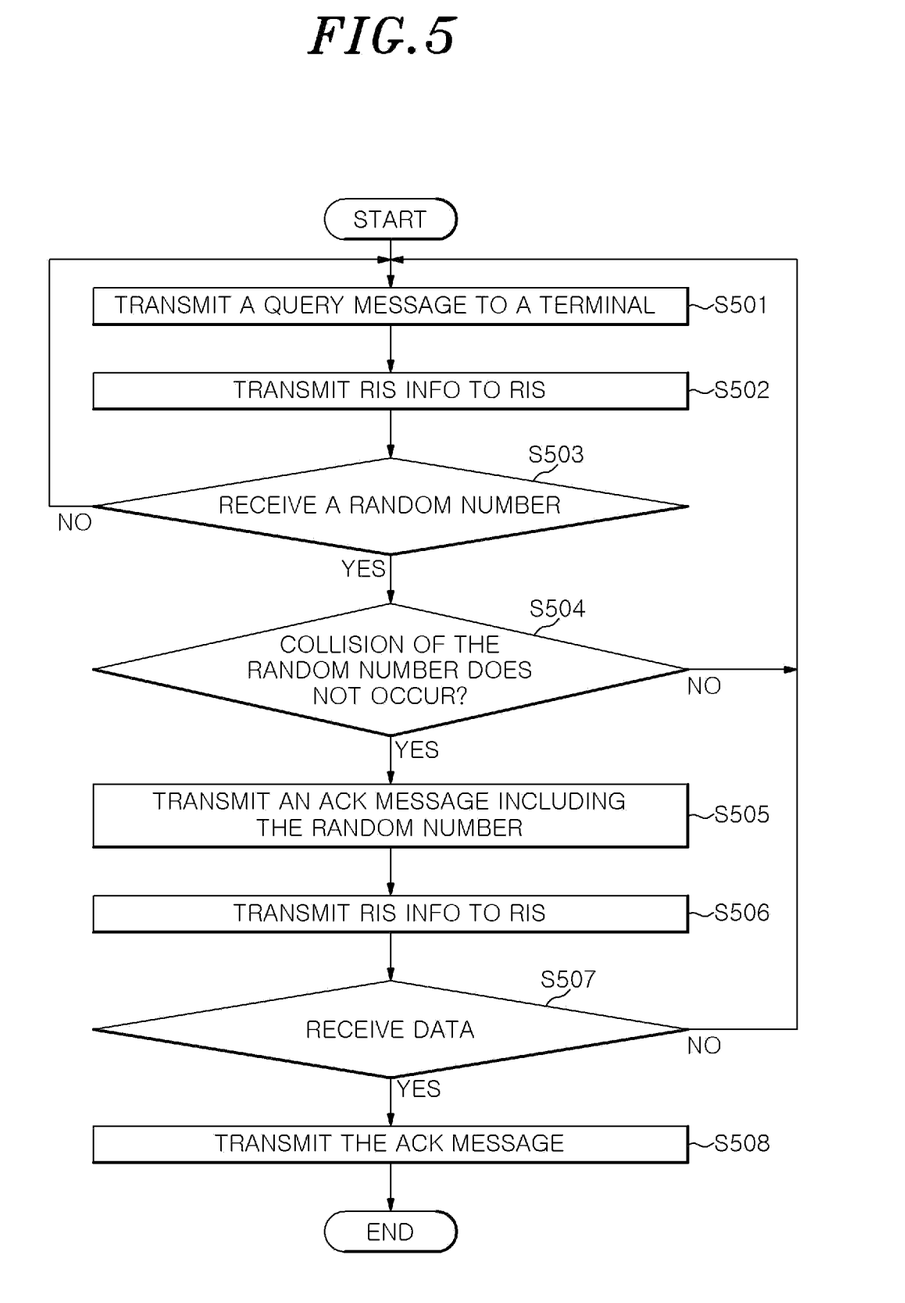
FIG. 5 is a flowchart illustrating a terminal operation of the data transmission system according to the embodiment.

FIG. 5 is a flowchart illustrating a terminal operation of the data transmission system according to the embodiment.

As shown in FIG. 5, a time slot in a frame is randomly selected by receiving a query message from the AP (S401), and a random number may be selected from the corresponding time slot (S402). After the selected random number is transmitted to the RIS (S403), the processing order varies depending on whether the terminal receives an ACK message including the random number (S404). If the terminal received the ACK message including the random number, it moves to the data transmission step and transmits data (S405). If the terminal did not receive the ACK message including the random number, it returns to the initial step.

The terminal that has successfully transmitted data receives an ACK message from the AP (S406), and if the ACK message is received, the data transmission step is terminated, and if the ACK message is not received, the terminal returns to the initial step. The terminals that have returned to the initial stage wait to receive the query message sent by the AP.

Figure 6:
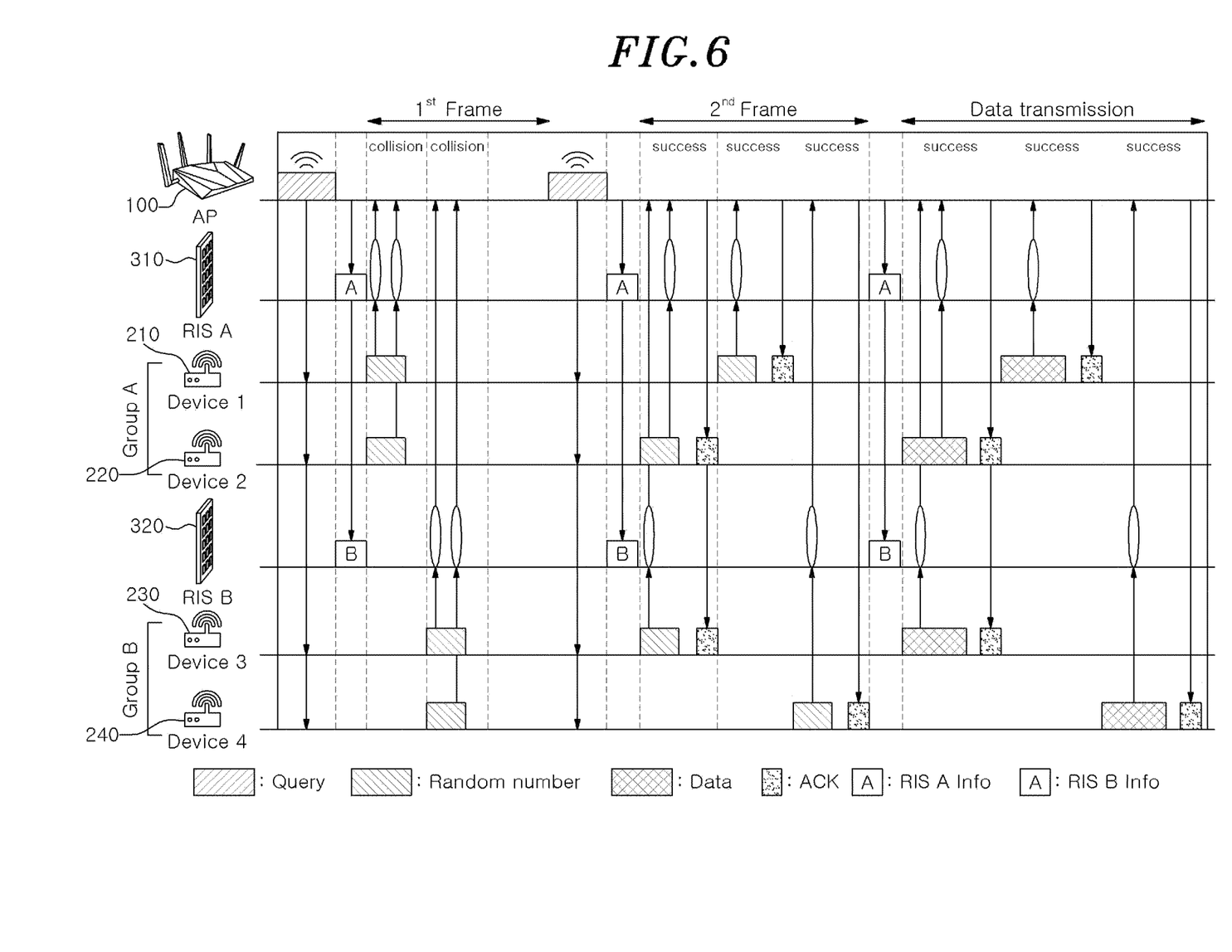
FIG. 6 is a flowchart illustrating an AP operation of the data transmission system according to the embodiment.

FIG. 6 is a flowchart illustrating an AP operation of the data transmission system according to the embodiment.

As shown in FIG. 6, after transmitting a request message to terminals (S501), RIS Info is transmitted to RIS A and RIS B (S502). If the terminals received the random number information (S503), it can be proceeded to a step of checking whether random numbers collide in each slot (S504).

If the terminals did not receive the random number, it returns to the initial stage and prepares to transmit the request message in the next frame.

If the AP received the random number, it checks whether the random numbers collide in each slot, and if no collision occurs, it may transmit an ACK message including the random number (S505). Thereafter, RIS Info is transmitted to RIS A and RIS B (S506). If there is a slot in which a random number collides, it returns to the initial stage.

If RIS Info is transmitted to RISs by transmitting an ACK message including a random number, the next step proceeds depending on whether data is received (S507). If the data is received, an ACK message is transmitted and the data collection step ends (S508). If data is not received, it returns to the initial stage and prepares to transmit the request message in the next frame.

Figure 7:
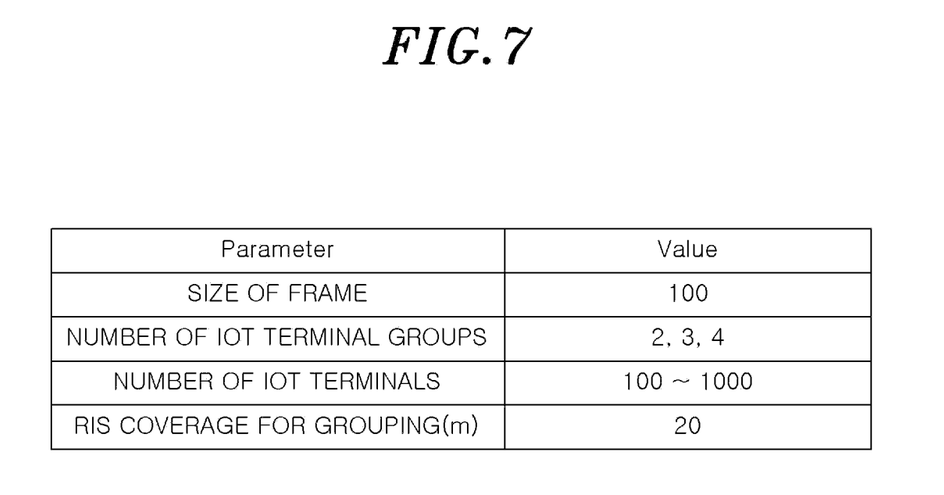
FIGS. 7 and 8 are diagrams for explaining data processing rates according to changes in the number of terminals.
Figure 8:
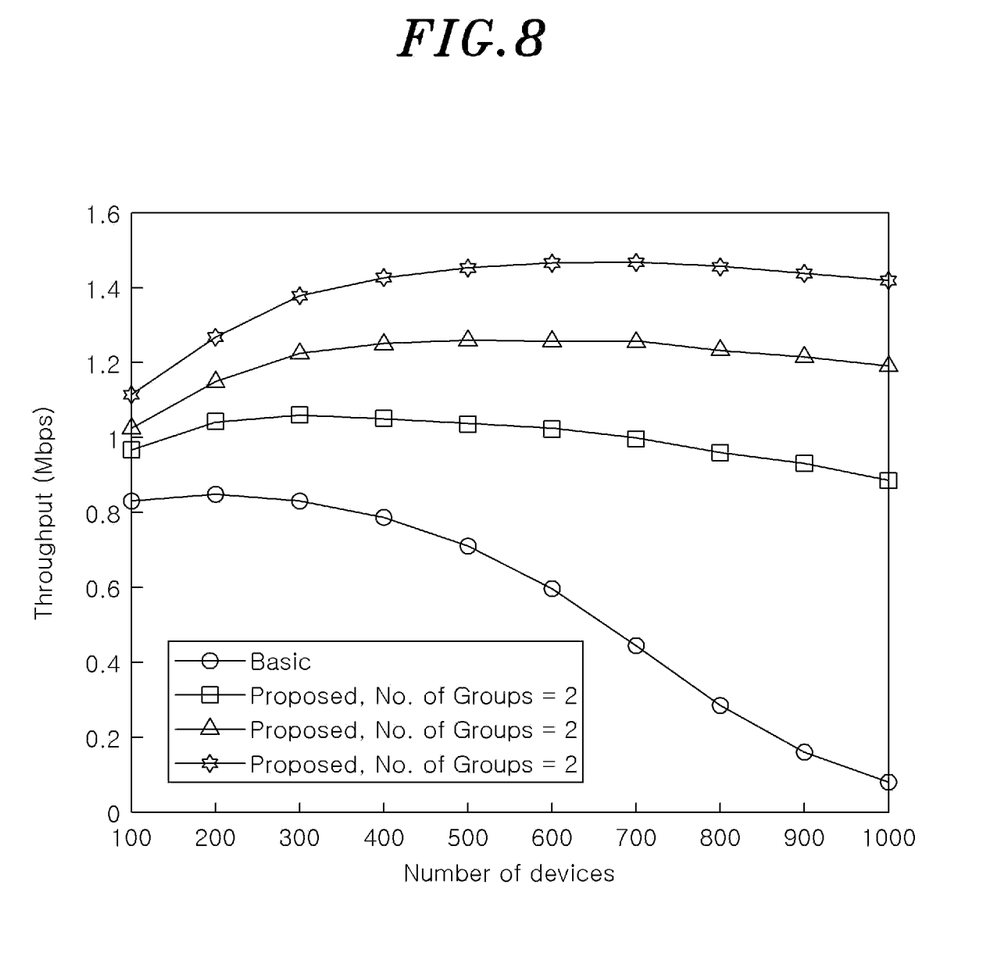

FIGS. 7 and 8 are diagrams for explaining data processing rates according to changes in the number of terminals.

In order to confirm the performance of the device for the examples, the existing protocol and data throughput were compared through simulation. Parameters used in the simulation were set as shown in FIG. 7. The frame size was fixed at 100, and the number of terminal groups was set to 2, 3, and 4. The number of terminals participating in the competition was changed from 100 to 1000 to evaluate performance, and the coverage of the RIS for grouping was set to 20 m.

As shown in FIG. 8, the throughput of the existing method decreases as the number of terminals increases. This is because the probability that the terminals select the same slot increases as the number of terminals increases. Through the proposed method, the rapid performance decrease caused by the increase in the number of terminals in the existing method is alleviated.

This is because, when terminals located in different groups select the same slot, a collision does not occur by reflecting and transmitting data through RIS for each group. In addition, it was confirmed that the processing rate of the proposed method was improved as the number of groups increased. This is because, when the method of the embodiment is applied, the number of terminals capable of transmitting data in the same slot without collision increases as the number of groups increases.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for transmitting data, comprising:
arranging a plurality of reconfigurable intelligent surfaces (RIS) based on INFO message of an Access Point (AP);
grouping a plurality of terminals disposed within a predetermined distance from the RIS for each RIS based on distance information from the RIS; and
when data is received in the RIS from at least one or more of the grouped terminals, transmitting the received data to the AP.

2. The method of claim 1, wherein in the transmitting of the received data to the AP, the plurality of terminals receive a query message from the AP, selects a time slot within a frame included in the query message, and transmits data to the RIS within the selected time slot.

3. The method of claim 2, wherein the query message of the AP includes information on a size and a time slot of a frame used for communication between the AP and the plurality of terminals.

4. The method of claim 3, wherein the transmitting of the received data to the AP comprises calculating a random number within a size of a frame, selecting a time slot, and providing the calculated random number to the AP.

5. The method of claim 4, wherein the transmitting of the received data to the AP comprises transmitting the data to the RIS within a time slot corresponding to the random number upon receiving an ACK message including the random number from the AP.

6. The method of claim 1, wherein the transmitting of the received data to the AP comprises transmitting the data received by the RIS to the AP by beamforming.

7. The method of claim 1, wherein the INFO message includes a reflection angle of the RIS.

8. An apparatus for transmitting data, comprising:
a memory in which a data transmission control program is stored; and
a processor executing the data transmission control program,
wherein the processor arranges a plurality of reconfigurable intelligent surfaces (RIS) based on an INFO message of an Access Point (AP), groups a plurality of terminals disposed within a certain distance from the RIS based on distance information from the RIS for each RIS, and when data is received in the RIS from at least one of the grouped terminals, transmits the received data to the AP.

9. The apparatus of claim 8, wherein the processor transmits the data received by the RIS to the AP by beamforming.

10. The apparatus of claim 8, wherein the INFO message includes a reflection angle of the RIS.

11. The apparatus of claim 10, wherein the processor checks a query message received from the AP, selects a time slot within a frame included in the query message, and transmits data to the RIS within the selected time slot.

12. The apparatus of claim 11, wherein the query message includes information on a size and a time slot of a frame used for communication between the AP and the plurality of terminals.

13. The apparatus of claim 12, wherein the processor calculates a random number within the size of the frame, selects the time slot, and provides the calculated random number to the AP.

14. The apparatus of claim 13, wherein the processor transmits the data to the RIS within a time slot corresponding to the random number upon receiving an ACK message including the random number from the AP.

15. A non-transitory computer-readable storage medium including computer executable instructions, wherein the instructions, when executed by a processor, cause the processor to perform a data transfer method, the method comprising:

arranging a plurality of reconfigurable intelligent surfaces (RIS) based on INFO message of an Access Point (AP);

grouping a plurality of terminals disposed within a predetermined distance from the RIS for each RIS based on distance information from the RIS; and when data is received in the RIS from at least one or more of the grouped terminals, transmitting the received data to the AP.

16. The non-transitory computer-readable recording medium of claim 15, wherein in the transmitting of the received data to the AP, the terminal receives a query message from the AP, selects a time slot within a frame included in the query message, and transmits data to the RIS within the selected time slot.

17. The non-transitory computer-readable recording medium of claim 16, wherein the query message of the AP includes information on a size and a time slot of a frame used for communication between the AP and the plurality of terminals.

18. The non-transitory computer-readable recording medium of claim 17, wherein the transmitting of the received data to the AP comprises calculating a random number within the size of the frame, selecting the time slot, and providing the calculated random number to the AP.

19. The non-transitory computer-readable recording medium of claim 18, wherein the transmitting of the received data to the AP comprises transmitting the data to the RIS within a time slot corresponding to the random number upon receiving an ACK message including the random number from the AP.

20. The non-transitory computer-readable recording medium of claim 15, wherein the INFO message includes a reflection angle of the RIS.

* * * * *